United States Patent
Baumann et al.

(10) Patent No.: US 7,155,083 B2
(45) Date of Patent: Dec. 26, 2006

(54) MONOLITHIC WAVEGUIDE/MEMS SWITCH

(75) Inventors: Frieder Heinrich Baumann, Red Bank, NJ (US); Ho Bun Chan, Gainsville, FL (US); Dan T. Fuchs, Summit, NJ (US); Howard Roy Stuart, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/478,189

(22) Filed: Jun. 29, 2006

(65) Prior Publication Data

US 2006/0245686 A1 Nov. 2, 2006

Related U.S. Application Data

(63) Continuation of application No. 10/746,566, filed on Dec. 24, 2003, which is a continuation-in-part of application No. 10/081,498, filed on Feb. 22, 2002, now abandoned.

(51) Int. Cl.
*G02B 6/35* (2006.01)
*G02B 6/12* (2006.01)
*G02B 1/01* (2006.01)
(52) U.S. Cl. .............. 385/16; 385/1; 385/14
(58) Field of Classification Search .......... 385/1–10, 385/16–24
See application file for complete search history.

(56) References Cited

U.S. PATENT DOCUMENTS

| 4,904,042 | A | 2/1990 | Dragone |
| 5,076,654 | A | 12/1991 | Presby ............... 385/129 |
| 5,949,571 | A | 9/1999 | Goossen et al. |
| 5,974,207 | A | 10/1999 | Aksyuk et al. |
| 6,049,640 | A | 4/2000 | Doerr |
| 6,304,709 | B1 | 10/2001 | Fujita ................ 385/140 |
| 6,315,462 | B1 * | 11/2001 | Anthamatten et al. ...... 385/83 |
| 6,508,561 | B1 | 1/2003 | Alie et al. ............ 359/883 |
| 6,697,552 | B1 | 2/2004 | McGreer et al. ........ 385/37 |
| 2002/0159701 | A1 * | 10/2002 | Katayama et al. ........ 385/39 |
| 2003/0058520 | A1 | 3/2003 | Yu et al. ............ 359/291 |
| 2003/0095777 | A1 | 5/2003 | Janssen ............. 385/140 |
| 2004/0022483 | A1 | 2/2004 | Staple et al. ........... 385/18 |

* cited by examiner

*Primary Examiner*—Michelle Connelly-Cushwa

(57) ABSTRACT

A monolithic waveguide/MEMS switch is disclosed that has a waveguide portion and a MEMS mirror portion fabricated on a single substrate, such as a as a silicon-on-insulator wafer. The monolithic waveguide/MEMS switch adjusts the phase of an optical signal by varying the position of one or more moveable mirrors. The mirror portion includes a mirror having a reflective surface that is attached to at least one MEMS actuator to achieve in-plane motion of the mirror (moves parallel to a plane of said at least one waveguide). In one implementation, the MEMS actuator is embodied as a known comb drive actuator. The phase adjustment techniques of the present invention may be employed in various optical devices, including wavelength selective optical switches that support multiple optical channels.

10 Claims, 7 Drawing Sheets

MONOLITHIC WAVEGUIDE/MEMS SWITCH

CROSS-REFERENCE TO RELATED APPLICATIONS

The present application is continuation of U.S. patent application Ser. No. 10/746,566, filed Dec. 24, 2003 entitled "Monolithic Waveguide/MEMS Switch," which is a continuation in part of U.S. patent application Ser. No. 10/081,498, Feb. 22, 2002 entitled "Planar Lightwave Wavelength Device Using Moveable Mirrors," now abandoned and is related to U.S. patent application Ser. No. 10/387,852, entitled "Waveguide/MEMS Switch," each incorporated by reference herein.

FIELD OF THE INVENTION

The present invention relates to mechanisms for manipulating light in optical waveguides and, more particularly, to optical devices having micro electro-mechanical systems (MEMS) switches for manipulating light in optical waveguides.

BACKGROUND OF THE INVENTION

Optical communication systems increasingly employ wavelength division multiplexing (WDM) techniques to transmit multiple information signals on the same fiber, and differentiate each user sub-channel by modulating a unique wavelength of light. WDM techniques are being used to meet the increasing demands for improved speed and bandwidth in optical transmission applications. Optical switches are often realized in optical waveguides that can be manufactured with low cost and enable easy multiplexing and de-multiplexing of the WDM signal using waveguide grating routers (WGR). Switching in waveguides is often accomplished by applying phase or amplitude changes using an electrooptic effect or a thermooptic effect.

Planar lightwave circuit technology permits the large-scale integration of optical functionality on a single chip enabling applications such as reconfigurable add-drop multiplexers, tunable filters and dispersion compensators. Waveguide switches are typically constructed using Mach Zehnder Interferometers (MZI) combined with thermooptic phase shifters. These thermal phase shifters suffer from high power consumption and thermal crosstalk, limiting the scale of integration. Recently, micro-electromechanical systems (MEMS) based actuators have been explored for optical switching. Electrostatically actuated MEMS devices are attractive for large scale switching applications because of their inherently low power consumption.

U.S. patent application Ser. No. 10/081,498, to Aksyuk et al., entitled "Planar Lightwave Wavelength Device Using Moveable Mirrors," discloses optical switches that adjust the phase of an optical signal by varying the path length of the optical signal using one or more moveable mirrors. A number of optical devices incorporating moveable mirrors are disclosed. In an exemplary 2-by-2 optical switch, two waveguides configured to include a coupler region carry light signals in both directions. A mirror is positioned at the output of each waveguide. The position of at least one of the mirrors may be adjusted along the optical path and the mirrors reflect the light exiting from the end of the waveguides back into the same waveguide after an adjustable phase delay due to the round trip optical path through an adjustable air gap between the waveguides and corresponding mirrors. The position of the mirrors may be controlled, for example, using micromachined control elements, such as micro electro mechanical systems (MEMS) switches, that physically move the mirror along the light path. In one implementation of the disclosed optical switches, the MEMS mirrors move out of the plane of the wafer containing the waveguide to change the phase of the optical signal. To package the device, a first MEMS chip must be adhered in a perpendicular relationship to a second silica waveguide chip, resulting in a challenging alignment and assembly process.

U.S. patent application Ser. No. 10/387,852, to Aksyuk et al., entitled "Waveguide/MEMS Switch," discloses an improved waveguide/MEMS switch having a waveguide device and a MEMS device that moves in the same plane as the waveguide device. The planar MEMS device includes a moveable mirror optically coupled to a waveguide of the waveguide device and adapted to move parallel to the plane of the MEMS device. Thus, in the disclosed waveguide/MEMS switch, the mirror moves in the same plane of the waveguide chip. The MEMS device may be adhered to the waveguide device in a conventional manner using a flip chip bonder, thereby simplifying the packaging and assembly of the waveguide/MEMS switch. Nonetheless, the waveguide/MEMS switch requires the fabrication of the two distinct planar waveguide and MEMS devices and the subsequent assembly into a single waveguide/MEMS switch. A need therefore exists for a monolithic waveguide/MEMS switch on a single wafer, such as a silicon-on-insulator (SOI) wafer, and a method for fabricating such monolithic waveguide/MEMS switches.

SUMMARY OF THE INVENTION

Generally, a monolithic waveguide/MEMS switch is disclosed that has a waveguide portion and a MEMS mirror portion fabricated on a single substrate, such as a as a silicon-on-insulator wafer. The monolithic Waveguide/MEMS switch adjusts the phase of an optical signal by varying the position of one or more moveable mirrors. The mirror portion includes a mirror having a reflective surface that is attached to at least one MEMS actuator to achieve in-plane motion of the mirror (moves parallel to a plane of said at least one waveguide). In one implementation, the MEMS actuator is embodied as a known comb drive actuator.

The phase adjustment techniques of the present invention may be employed in various optical devices, including optical switches that introduce a phase change and recombine the optical signal to switch a received optical signal to a desired output port. The invention may also be applied in wavelength selective optical switches that support multiple optical channels. The monolithic waveguide/MEMS switch is fabricated on a single substrate using a single technology and thus avoids many of the fabrication and packaging problems associated with prior techniques. In addition, the MEMS mirror and waveguide structures can be contained in the same mask level and are therefore accurately aligned (thereby eliminating the need for any post fabrication alignment).

A more complete understanding of the present invention, as well as further features and advantages of the present invention, will be obtained by reference to the following detailed description and drawings.

DETAILED DESCRIPTION

According to one aspect of the present invention, the waveguide and MEMS mirror assembly are monolithically fabricated in the same device layer of a single substrate, such as an SOI wafer. In this manner, the processing of waveguide/MEMS switches is significantly improved relative to conventional techniques which require processing of two different chips using two different technology types. With the present invention, all the processing is combined onto a single chip and technology. In addition, the MEMS mirror and waveguide structures can be contained in the same mask level and are therefore accurately aligned (thereby eliminating the need for any post fabrication alignment). As used herein, a monolithic integrated circuit is an integrated circuit formed in a single piece of substrate material.

Figure 1:
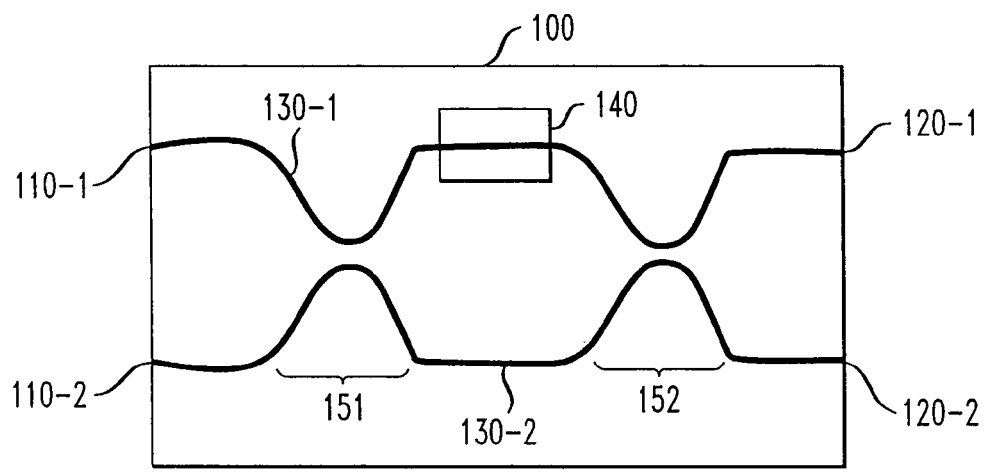
FIG. 1 illustrates an exemplary conventional (prior art) 2-by-2 MZI optical switch.

FIG. 1 illustrates an exemplary conventional 2-by-2 MZI optical switch 100 having two input ports 110-1, 110-2 and two output ports 120-1, 120-2, two 3 dB couplers 151 and 152, and at least one thermooptic phase shifter 140. Generally, the optical switch 100 accepts an incoming signal at an input port 110-1 or 110-2 and selectively passes the optical signal to one of the output ports 120-1 or 120-2. (For a discussion of MZIs, see, for example, Katsunari Okamoto, "Fundamentals of Optical Waveguides," p. 159, Academic Press (2000)).

Generally, the optical switch 100 accepts an incoming signal of multiple wavelength channels at an input port 110-1 or 110-2, which is then split into two equal parts in waveguides 130-1 and 130-2 at the 3 dB coupler 151. The phase of the signal in waveguide 130-1 can be changed, affecting the way in which the signals interfere when recombined at the second coupler 152 to selectively pass the optical signal to one of the output ports 120-1 or 120-2 or divide the intensity between them. Typically, the phase change is achieved by the thermooptic effect with heater 140 by varying the temperature of the waveguide 130-1 in which the optical signal travels. It has been found, however, that the necessary temperature change requires significant power consumption and generates significant cross-talk between nearby switches on the same chip limiting the amount of switches that can be put on one chip and the complexity of a switch system that can built.

Figure 2:
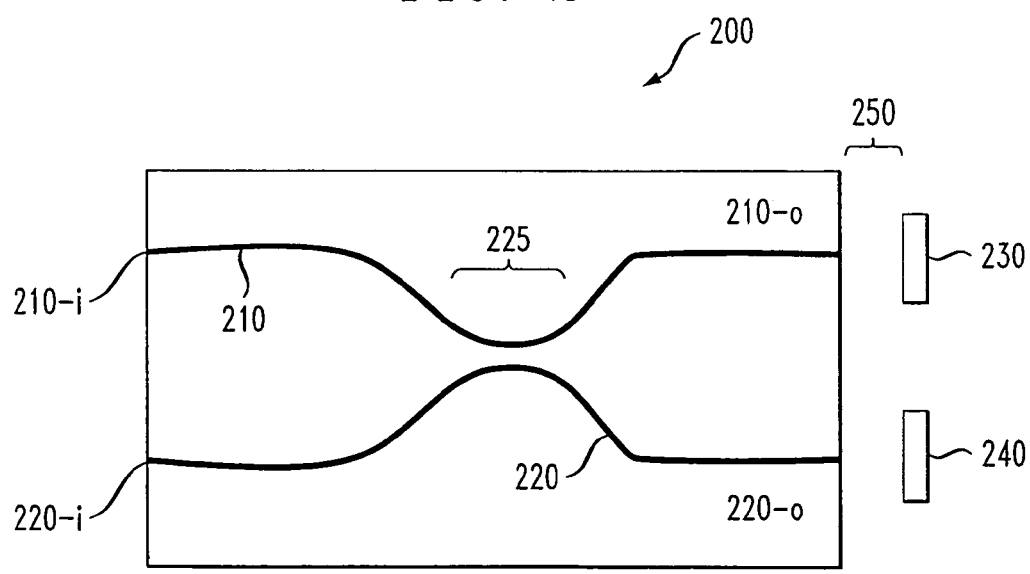
FIG. 2 illustrates an exemplary 2-by-2 optical switch employing moveable mirrors, such as those disclosed in U.S. patent application Ser. No. 10/081,498, to Aksyuk et al.

As previously indicated, a phase change can be achieved in an optical signal by varying the optical path length of the signal using one or more moveable mirrors. FIG. 2 illustrates an exemplary 2-by-2 optical switch 200 that employs one or more moveable mirrors to control the phase of light. As shown in FIG. 2, the optical switch 200 has two waveguides 210 and 220, each carrying light in both directions. The two waveguides 210 and 220 are configured to include a coupler region 225, in a known manner. As discussed hereinafter, the optical switch 200 is configured in a reflective mode (this also helps in reducing by a factor of 2, the necessary chip area needed for the switch). Thus, an input to a single waveguide, such as the input 210-$i$ (or 220-$i$) to the waveguide 210 (or 220), is both an input port and an output port of the optical switch 200.

As shown in FIG. 2, mirrors 230, 240 are positioned at the output of each waveguide 210, and 220. The position of at least one of the mirrors 230, 240 may be adjusted along the optical path. The mirrors 230, 240 reflect the light exiting from the end of the waveguides back into the waveguides 210, 220 after an adjustable phase delay due to the round trip through the adjustable air gap 250 between the waveguides 210, 220 and mirrors 230, 240, respectively. It is noted that the gap 250 can also be filled with index matching material to get more efficient coupling in and out of the waveguides, and possibly to increase damping of the mirror motion, and reduce the necessary applied voltage. However, diffraction losses can be minimized by reducing the gap 250 to a necessary minimum.

Generally, an optical signal applied to the input of a single waveguide, such as the input 210-$i$ to the waveguide 210, is split in the coupler region 225 into two generally equal components. Thereafter, the phase of at least one component of the optical signal is adjusted, as desired, by controlling the relative position of the mirrors 230, 240 to introduce a relative phase change in the reflected light. The optical components are then recombined in the coupler region 225 to accomplish constructive or destructive interference, based on the introduced phase change. In this manner, the optical signal appears at the appropriate output port of the optical switch 200.

Monolithic Silicon Waveguides and MEMS Phase Shifters

Figure 3:
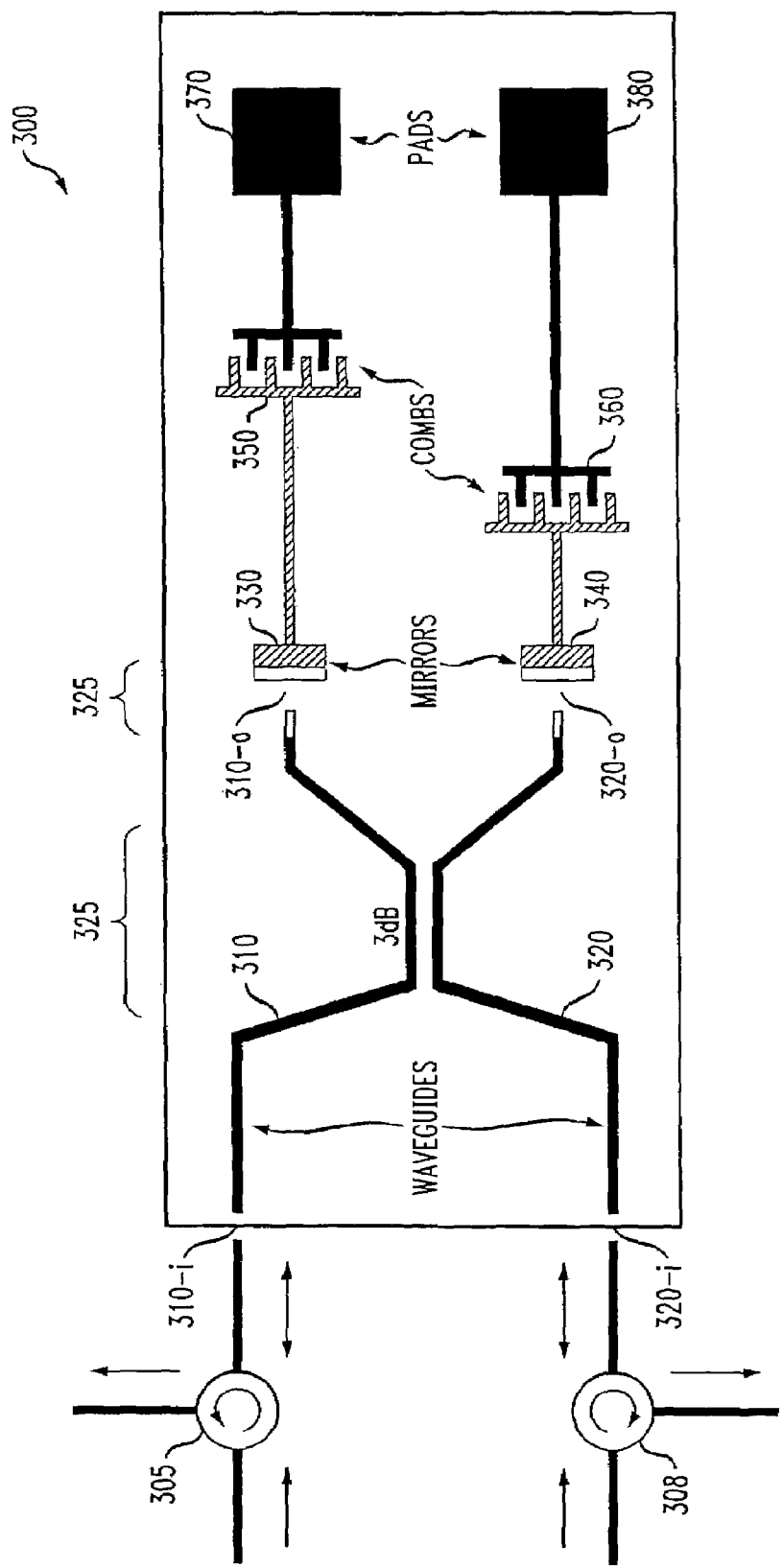
FIG. 3 illustrates an optical switch incorporating features of the present invention that includes the optical switch of FIG. 2 and at least one optical circulator to separate incoming and outgoing light.

As previously indicated, each waveguide 210 and 220 in the optical switch 200 of FIG. 2 potentially carries light in both directions. FIG. 3 illustrates a monolithic implementation of the optical switch 300 that includes the optical switch 200 of FIG. 2 and at least one optical circulator 305, 308 that separates incoming and outgoing light, in a known manner. In particular, FIG. 3 is a schematic diagram of a folded MZI 300 incorporating features of the present invention. As shown in FIG. 3, the interferometer 300 includes two input/output waveguides 310, 320 that merge into a 3 dB coupler 325 and split again. The light leaves the waveguides 310, 320 at outputs 310-o, 320-o for a short distance at a region 325 to travel in free space, and reflects off an actuated MEMS mirror 330, 340 back into the waveguides 310, 320.

As shown in FIG. 3, two circulators 305, 308 are connected to each port 310-1, 320-i to separate incoming and outgoing traffic. When both of the mirrors 330, 340 are equally spaced from the waveguides 310, 320, light that comes into the device 300 on the top port 310-i will leave from the bottom port 320-i as in a symmetric MZI. If one of the mirrors 330, 340 is moved, the moved mirror 330, 340 will form a relative phase shift $\phi$ between the two arms 310, 320 of the interferometer 300 and the output light will split between the top and bottom ports as $\sin^2(\phi/2)$ and $\cos^2(\phi/2)$, respectively. A phase shift $\phi$ equal to $\pi/2$ enables switching of the light between the two output ports, and since the light makes a double pass across the air gap, a quarter wavelength of mirror motion is sufficient for switching. The mirrors 330, 340 are moved using comb drive actuators 350, 360, such as those described in W. C. Tang et al., "Electrostatic Comb Drive of Lateral Polysilicon Resonators," Sensors and Actuators, A21, 328 (1990). In one exemplary implementation, the comb drive actuators 350, 360 can be designed to move a distance of $\lambda/4$ at an actuation voltage V, that is less than 45 V, and a distance $\lambda/2$ at an actuation voltage V, that is less than 70V.

According to one aspect of the invention, shown in FIG. 3, the exemplary MZI 300 includes silicon waveguides 310, 320 monolithically combined with MEMS-based phase shifters 330, 340 in a single chip 390, made on an SOI substrate for example.

Figure 4:
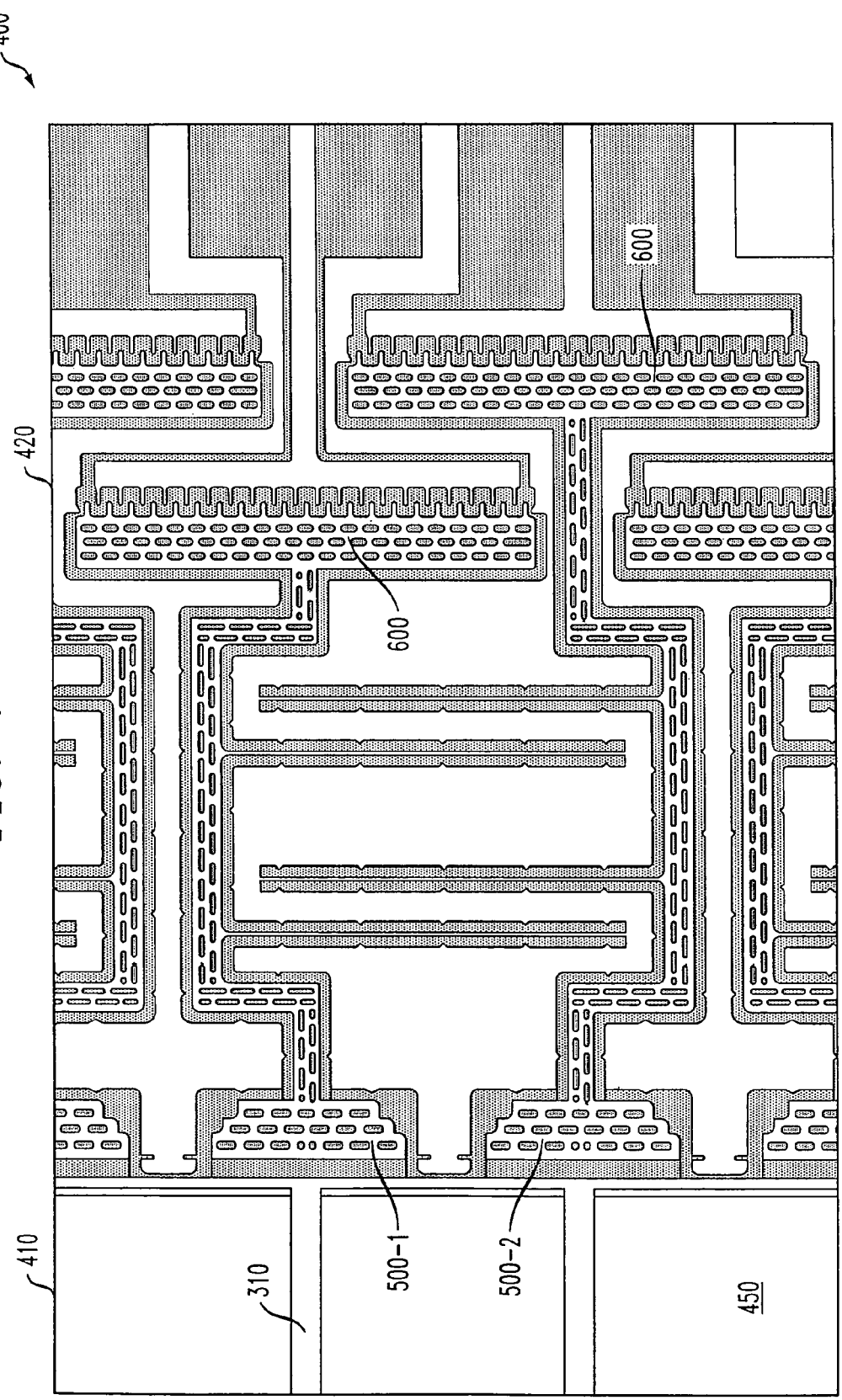
FIG. 4 is an optical micrograph of a top view of a monolithic Waveguide/MEMS Switch incorporating features of the present invention.

FIG. 4 is an optical micrograph of a top view of a monolithic waveguide/MEMS switch 400 incorporating features of the present invention. As shown in FIG. 4, the monolithic waveguide/MEMS switch 400 includes a waveguide portion 410 and a MEMS mirror portion 420 on a single chip 450. The waveguide portion 410 includes the two waveguides 310, 320. The MEMS mirror portion 420 includes two moveable mirror mechanisms 500-1 and 500-2, discussed further below in conjunction with FIG. 5, each of which includes a reflective surface designed for in-plane motion. The two moveable mirror mechanisms 500-1 and 500-2 are located in respective recesses, which expose the reflective surfaces to the corresponding waveguides 310 and 320 in the waveguide portion 410. The MEMS mirror portion 420 also includes two MEMS actuators 600, discussed further below in conjunction with FIG. 6, that achieve the in-plane motion of the mirrors 500-1 and 500-2.

Figure 5:
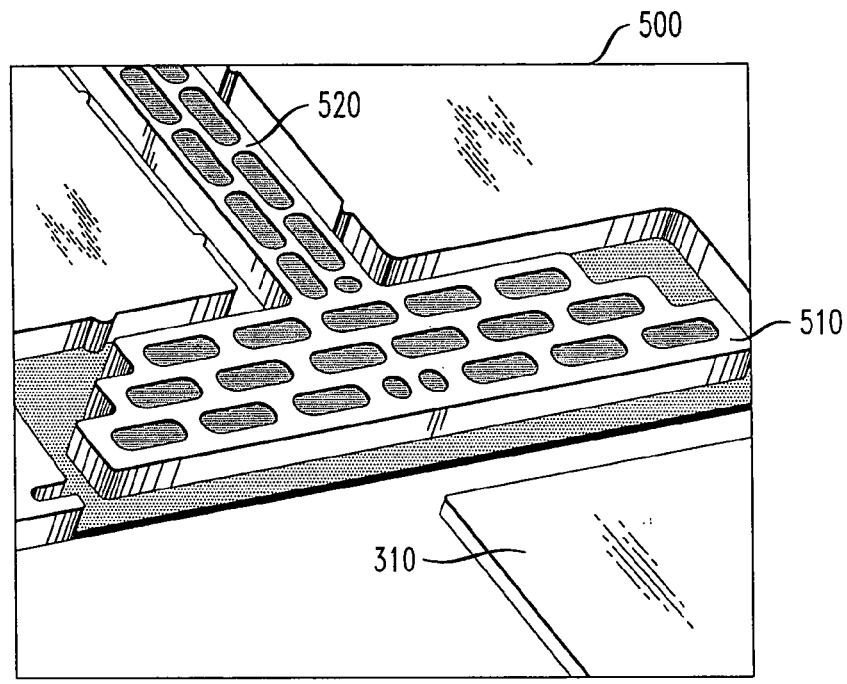
FIG. 5 is a scanning electron micrograph illustrating the moveable mirror mechanisms of FIG. 4 in further detail.

FIG. 5 illustrates the moveable mirror mechanisms 500 of FIG. 4 in further detail. As shown in FIG. 5, the moveable mirror mechanisms 500 include a reflective surface 510 that is adjacent the waveguides 310, 320 on the single chip 450. The moveable mirror mechanisms 500 each include a drive shaft 520 that is attached to a corresponding MEMS actuator 600, discussed below, to achieve the in-plane motion of the mirrors 500.

Figure 6:
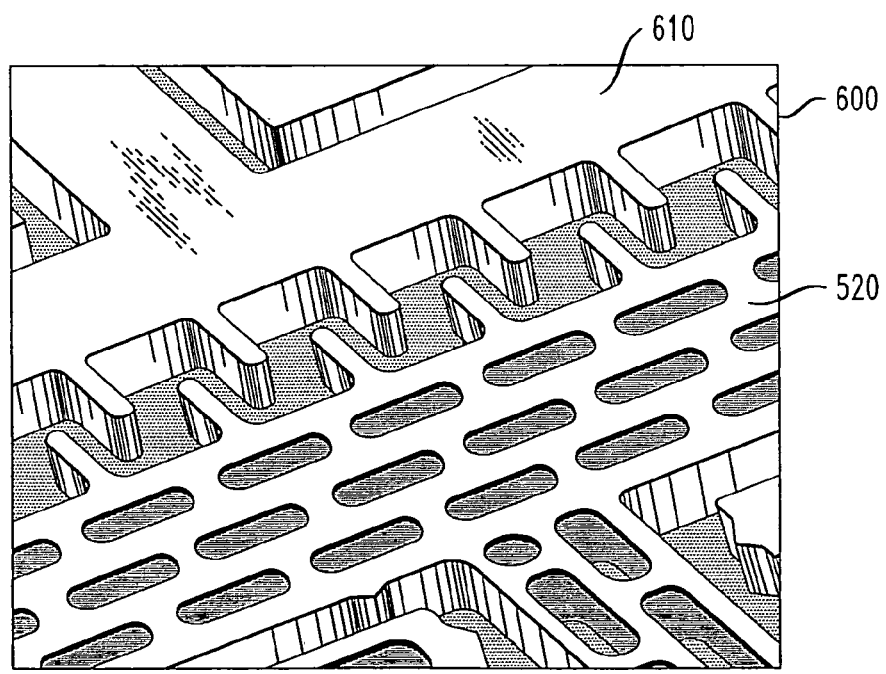
FIG. 6 is a scanning electron micrograph illustrating the MEMS actuators of FIG. 4 in further detail.

FIG. 6 illustrates the MEMS actuators 600 of FIG. 4 in further detail. As shown in FIG. 6, the MEMS actuators 600 include a stationary comb 610 that drives the arms 520 of FIG. 5. The comb drive actuator 600 may be embodied using the devices those described in W. C. Tang et al., "Electrostatic Comb Drive of Lateral Polysilicon Resonators," Sensors and Actuators, A21, 328 (1990). In one exemplary implementation, the comb drive actuators 600 can be designed to move a distance of $\lambda/4$ at an actuation voltage V, that is less than 45 V, and a distance $\lambda/2$ at an actuation voltage V, that is less than 70V.

The comb drive actuator 600 includes a moveable portion connected to a shaft 520 and a stationary portion 610 attached to a layer of the wafer. The shaft 520 and moveable portion of the actuator 520 are detached from underlying layers of the wafer to permit in plane motion of the shaft and mirror 500. As shown in FIG. 3, the stationary portion 610 is electrically connected to a contact pad 370, 380 using a contact track. Upon application of an appropriate voltage, the moveable portion will induce a change in the position of the mirror. For a more detailed discussion of an exemplary implementation of a comb drive actuator 600, see, for example, U.S. patent application Ser. No. 10/387,852, entitled "Waveguide/MEMS Switch," incorporated by reference herein above.

Fabrication of Monolithic Waveguide/MEMS Switch

Figure 7:
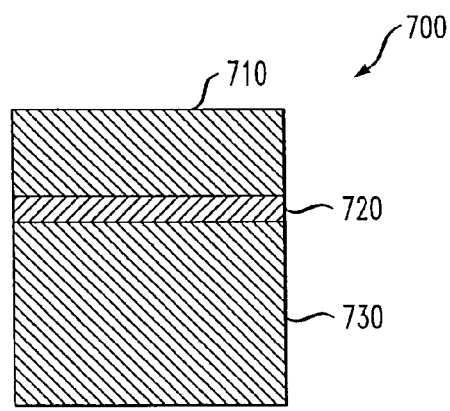
FIG. 7 illustrates an exemplary initial SOI wafer prior to fabrication.

FIG. 7 illustrates an exemplary initial SOI wafer 700 prior to fabrication in accordance with the present invention into a monolithic waveguide/MEMS switch 400, such as the monolithic waveguide/MEMS switch 400 shown in FIG. 4. The exemplary initial SOI wafer 700 comprises three layers: a silicon substrate layer 730, a thin silicon oxide insulating layer 720, and a Silicon (Si) device layer 710. The exemplary initial SOI wafer 700 consists of a 5.5 μm thick device layer 710 on top of a 2 μm buried oxide (BOX) layer 720 (comprised of $SiO_2$) on top of a Si substrate 730.

Figure 8A:
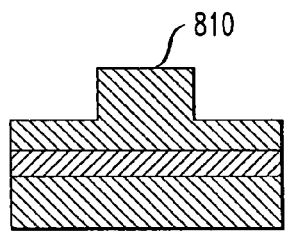
FIGS. 8A and 8B illustrate cross sectional views of an exemplary process for fabricating the waveguide portion of the monolithic Waveguide/MEMS Switch of FIG. 4.
Figure 8B:
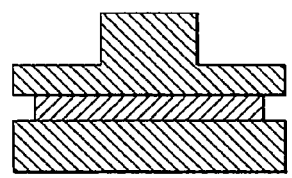
Figure 9A:
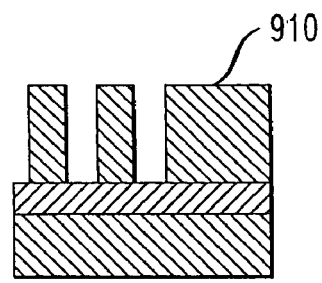
FIGS. 9A and 9B illustrate cross sectional views of an exemplary process for fabricating the MEMS mirror portion of the monolithic Waveguide/MEMS Switch of FIG. 4.

FIGS. 8A through 8B and 9A through 9B illustrate cross sectional views of the waveguide portion 410 and MEMS mirror portion 420, respectively, during various sequential steps of the fabrication process. Initially, two silicon reactive ion etching (RIE) steps are required to form the waveguide 810 and MEMS regions 910, as shown in FIGS. 8A and 9A, respectively. As shown in FIG. 8A, the ridge waveguide 810 is defined by etching partially into the silicon layer 710 (for example, 3.2 μm deep), whereas the MEMS section 910 (FIG. 9A) is defined by etching the silicon layer 710 completely, down to the BOX layer 720. The MEMS section 910 was P-doped while the waveguide section 810 remains undoped. The waveguides have a width of 4 μm throughout most of the device, with the width tapered out to 10 μm where the waveguide terminates at the fiber inputs and at the MEMS mirrors 500.

Figure 8C:
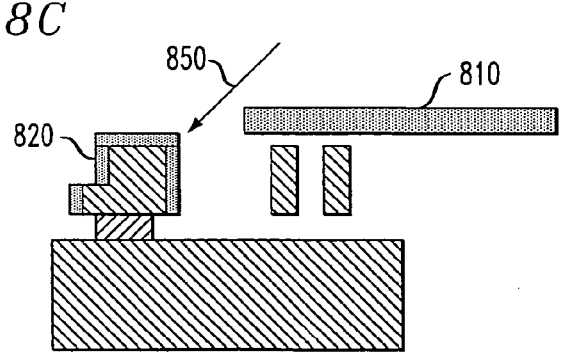
FIG. 8C illustrates a cross sectional view of the monolithic waveguide/MEMS switch during a coating of the reflective surfaces of the mirrors.
Figure 9B:
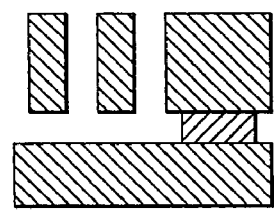
Figure 9C:
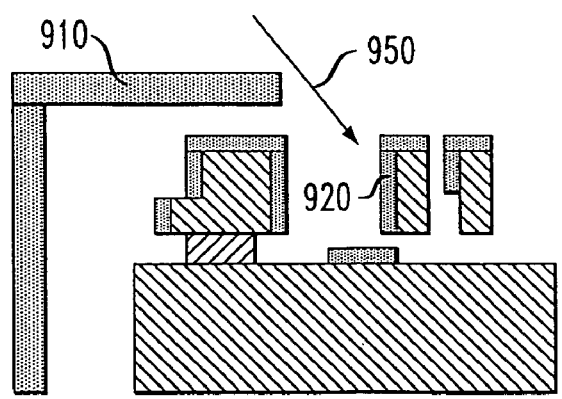
FIG. 9C illustrates a cross sectional view of the monolithic waveguide/MEMS switch during a coating of the antireflective surfaces of the waveguide portion.

After silicon etching, the chip is cut and polished for fiber coupling and the structure is then mechanically released by etching the sacrificial oxide with a buffered oxide etch (BOE) and dried using a critical point drying process, as shown in FIGS. 8B and 9B. After the structure is released, the waveguide termination facing the mirror is coated with an anti-reflection (AR) material 820, for example, at a 45° angle in the direction of arrow 850, using a shadow mask 810, as shown in FIG. 8C. In addition, the etched sidewalls of the mirrors are coated with gold 920 (a reflective metal), at a 45° angle in the direction of arrow 950, using a shadow mask 910, as shown in FIG. 9C. The gap between the mirror and waveguide in the exemplary embodiment is 7.5 μm. The size of the entire MEMS actuator and mirror is smaller than 350×200 μm² in this example. Thirteen devices including the waveguides fit onto an 11×9 mm² chip.

Performance of Monolithic Waveguide/MEMS Switch

The monolithic waveguide/MEMS switch 400 of FIG. 4 was evaluated by introducing polarized laser light at $\lambda=1540$ nm into one of the circulators' inputs and measuring the emerging light from the same (bar port) and other (cross port) circulator. The monolithic waveguide/MEMS switch 400 demonstrated an insertion loss, IL, equal to 13.3 dB and an extinction ratio, ER, equal to 21.0 dB in the cross-port, and IL equal to 11.2 dB and ER equal to 10.4 dB in the bar port. A portion of this loss (~7 dB) is due to a combination of waveguide propagation loss, mode mismatch at the fiber interface, and residual surface roughness at the polished end face. An additional loss of ~1.7 dB is expected to result from diffraction in the air gap at the MEMS micromirror, ~1.3 dB loss is due to the circulators. The diffraction loss and fiber mode mismatch can both be reduced by employing mode converters to increase the vertical size of the silicon layer at the interfaces. The waveguide couplers were implemented using directional couplers, and exhibited a splitting ratio of roughly 60/40 percent, increasing the insertion loss in the cross port and decreasing the extinction ratio in the bar port (this can be improved towards 50/50 with improved processing). The use Multimode interference (MMI) couplers instead of directional couplers may also help in improving performance because they are less sensitive to variations in the waveguide dimensions and exhibit less polarization dependence.

Figure 10:
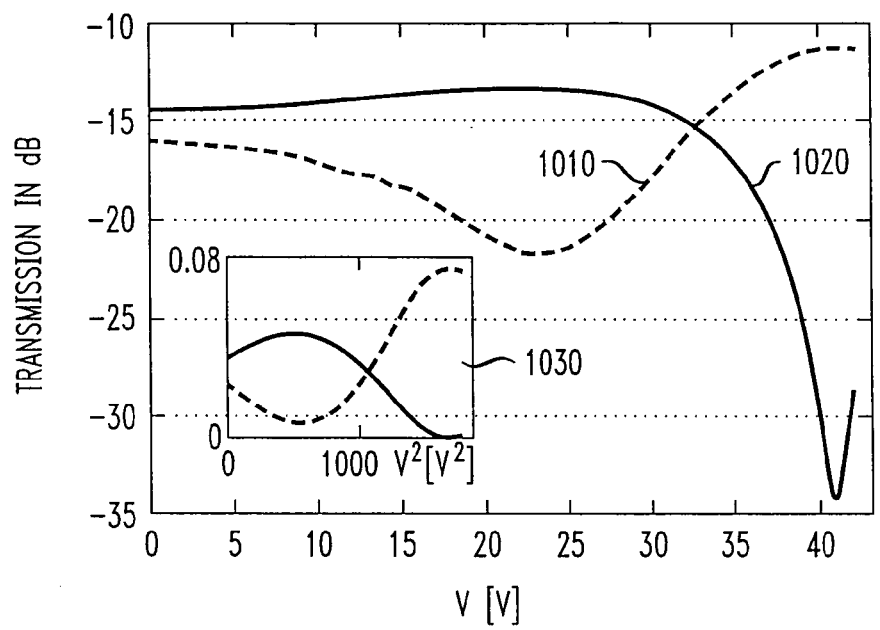
FIG. 10 illustrates the voltage dependence of the transmission of the switch (the inset displays the linear dependence of the mirror motion versus voltage squared of the monolithic Waveguide/MEMS Switch of FIG. 4)

FIG. 10 illustrates the voltage dependence of the transmission of the optical power. FIG. 10 indicates the bar state (dashed line) 1010 and cross state (solid line) 1020 polarized laser light transmission through the device including the circulators. The comb drive motion is expected to be roughly quadratic in voltage. The inset plot 1030 in FIG. 10 shows the same data where the y axis is in mW and the x axis is in $V^2$ showing the $\sin^2(V^2)$ nature of the signal.

Figure 11:
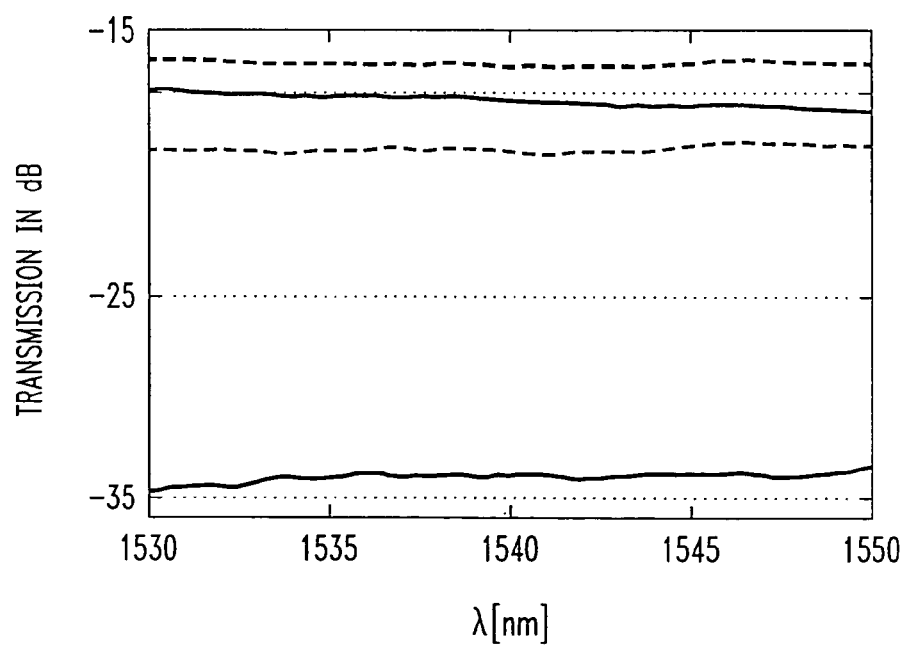
FIG. 11 illustrates transmission as a function of wavelength for a broadband unpolarized source for the on and off voltages for bar (dashed) and cross (solid) ports in the monolithic Waveguide/MEMS Switch of FIG. 4.

FIG. 11 illustrates transmission as a function of wavelength for a broadband unpolarized source for the on and off voltages for bar (dashed) and cross (solid) ports. A 1.2 dB variation in the power across a 20 nm range for the cross port and 0.6 dB variation in the bar port is observed, this demonstrates the broadband capability of the switch. (Due to the polarization dependence the transmission values for unpolarized light are different from the polarized case) The Polarization Dependent Loss (PDL) was found to be 1.5 dB at the cross port and 1.0 dB at the bar port when the output was set to the on states for each port. In the off state the PDL are 7.76 dB and 5 dB for the cross and bar ports. This is strongly influenced by the polarization dependence of the directional couplers and is expected to improve significantly with the implementation of MMI couplers.

The mechanical resonance of the mirrors can be measured by monitoring their response to a small voltage dither while varying frequency. The resonance frequency was 21.1 kHz with a width of ~1 kHz consistent with a mechanical simulation. The switching time is 150 μs (10–90%). By increasing the lithography resolution one could manufacture smaller, lower voltage and faster devices. Power consumption of the switch is determined mostly by the leakage current which is smaller than 0.5 nA limiting the power consumption to 25 nW at 50V, this practically eliminates any power consumption of the phase shifting device for most applications.

It is noted that while the monolithic waveguide/MEMS switch 400 was demonstrated using a 2×2 MZI switch, the techniques of the present invention can be applied in any waveguide device where low power consumption phase shifting is desired.

It is to be understood that the embodiments and variations shown and described herein are merely illustrative of the principles of this invention and that various modifications may be implemented by those skilled in the art without departing from the scope and spirit of the invention.

We claim:

1. An optical device on a single substrate, comprising:
    a monolithically fabricated waveguide portion having at least one waveguide; and
    a mirror portion fabricated on said single substrate with said waveguide portion, wherein said mirror portion includes at least one mirror that is adapted to move parallel to a plane of said at least one waveguide and wherein said mirror portion includes at least one element monolithically fabricated in said single substrate with said waveguide portion.

2. The optical device according to claim 1, wherein said single substrate is a silicon-on-insulator wafer.

3. The optical device according to claim 1, wherein said at least one mirror is controlled by a micromachine control element that positions said mirror in a desired position along an optical path.

4. The optical device according to claim 1, wherein said mirror is positioned at an end of said at least one waveguide.

5. The optical device according to claim 1, wherein said mirror is fabricated using a reflective coating.

6. The optical device according to claim 1, wherein said waveguide portion is coated with an antireflective coating.

7. The optical device according to claim 1, wherein an adjustment to a position of said mirror adjusts a phase of an optical signal.

8. The optical device according to claim 1, wherein said mirror portion comprises a stationary portion having an actuator rigidly connected to a substrate and a moveable portion comprising a moveable mirror, a shaft rigidly connected to said moveable mirror and a moveable portion of the actuator rigidly connected to the shaft.

9. An optical device on a single substrate, comprising:
    a monolithically fabricated waveguide portion having at least one waveguide; and
    a mirror portion fabricated on said single substrate with said waveguide portion, wherein said mirror portion includes at least one mirror that is adapted to move parallel to a plane of said at least one waveguide and wherein said mirror portion includes at least one element monolithically fabricated in said single substrate with said waveguide portion; and
    a micromachine control element that positions said mirror in a desired position along an optical path.

10. The optical device according to claim 9, wherein an adjustment to a position of said mirror adjusts a phase of an optical signal.

* * * * *

UNITED STATES PATENT AND TRADEMARK OFFICE
CERTIFICATE OF CORRECTION

| | | |
|---|---|---|
| PATENT NO. | : 7,155,083 B2 | Page 1 of 1 |
| APPLICATION NO. | : 11/478189 | |
| DATED | : December 26, 2006 | |
| INVENTOR(S) | : Baumann et al. | |

It is certified that error appears in the above-identified patent and that said Letters Patent is hereby corrected as shown below:

Title Page, In the References Cited section, after "6,697,552" and before "2/2004" replace "B1" with --B2--.

Title Page, In the abstract, line 3, after "such as a" and before "silicon-on-insulator" please take away "as a".

In the specification, column 2, line 38, after "such as a" please take away "as a".

Column 3, line 1, after "THE" replace "DRAWING" with --DRAWINGS--.

Column 4, line 20, after "can" and before "built" insert --be--.

Column 5, line 12, after "port" and before "320-i" replace "310-1," with --310-i,--.

Signed and Sealed this

Twenty-first Day of October, 2008

JON W. DUDAS
*Director of the United States Patent and Trademark Office*